No. 721,860. PATENTED MAR. 3, 1903.
M. J. CARR.
KITCHEN CABINET.
APPLICATION FILED OCT. 20, 1902.
NO MODEL. 2 SHEETS—SHEET 1.

Witnesses
Inventor
M. J. Carr.
By Jas. J. Sheehy
Attorney

No. 721,860. PATENTED MAR. 3, 1903.
M. J. CARR.
KITCHEN CABINET.
APPLICATION FILED OCT. 20, 1902.
NO MODEL. 2 SHEETS—SHEET 2.
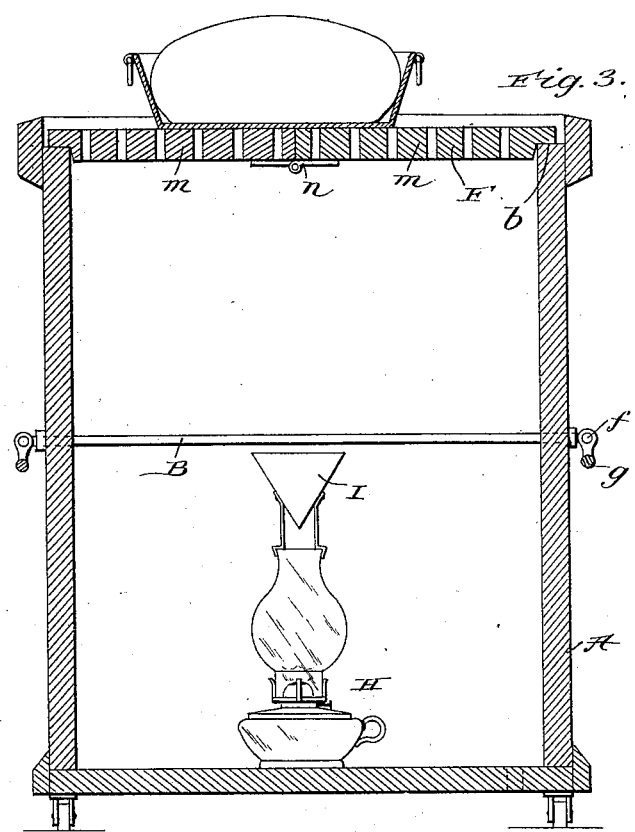
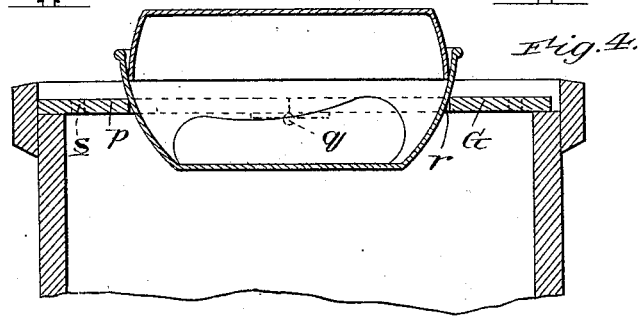
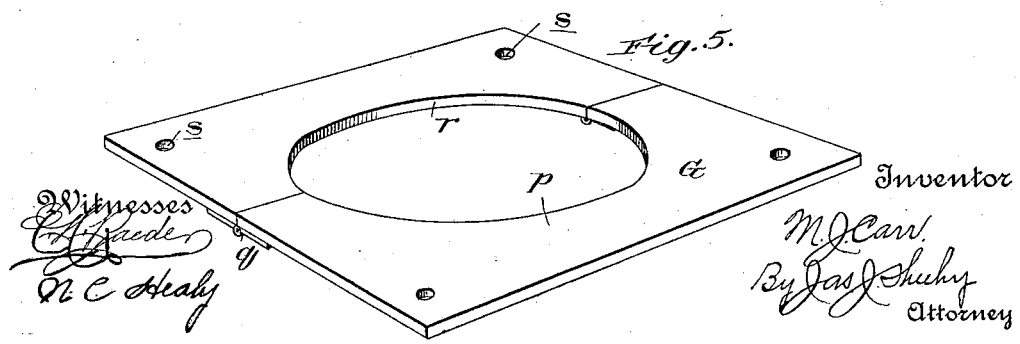

UNITED STATES PATENT OFFICE.

MICHAEL J. CARR, OF GRAND MARAIS, MICHIGAN.

KITCHEN-CABINET.

SPECIFICATION forming part of Letters Patent No. 721,860, dated March 3, 1903.

Application filed October 20, 1902. Serial No. 128,026. (No model.)

*To all whom it may concern:*

Be it known that I, MICHAEL J. CARR, a subject of the King of Great Britain, residing at Grand Marais, in the county of Alger and State of Michigan, have invented new and useful Improvements in Kitchen-Cabinets, of which the following is a specification.

My invention relates to improvements in kitchen-cabinets; and it has for its general object to provide a kitchen-cabinet calculated to prove highly useful in connection with the making and keeping of bread.

With the foregoing in mind the invention will be fully understood from the following description and claims when taken in connection with the accompanying drawings, in which—

Figure 1:
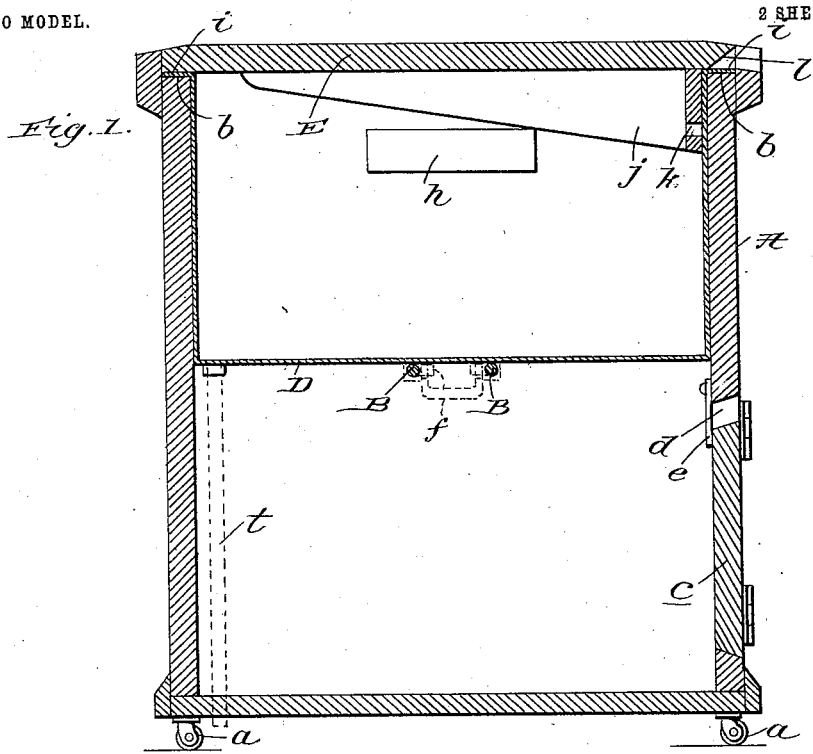
Figure 2:
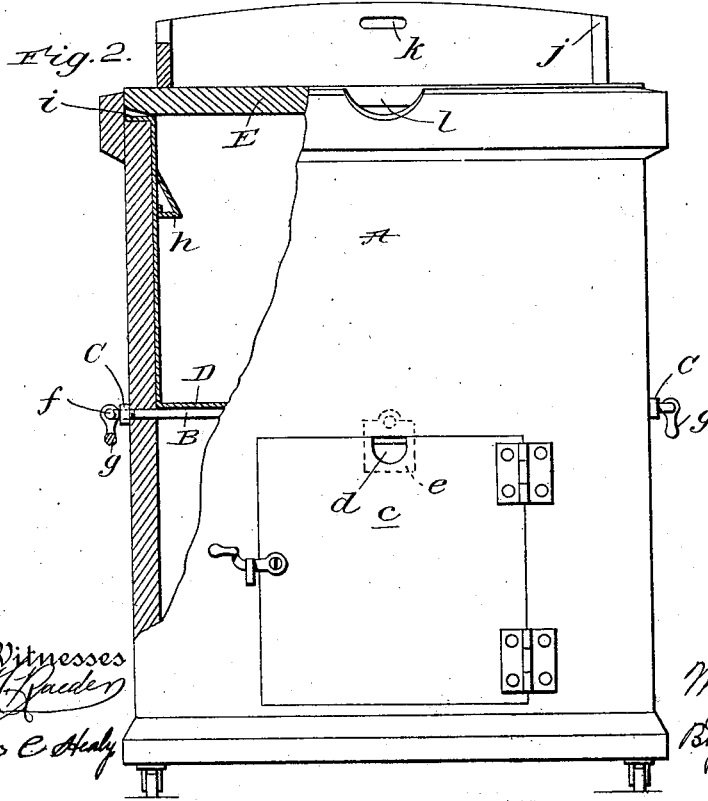

Figure 1 is a vertical section of my improved cabinet as it appears when adapted to contain bread. Fig. 2 is an elevation, partly in section, of the cabinet with its cover inverted and adapted to serve as a dough mixing or kneading board. Fig. 3 is a vertical section of the cabinet as it appears when adapted to raise loaves of dough in pans. Fig. 4 is a similar view of the upper portion of the cabinet, illustrating the mode of raising a mass of dough precedent to forming the same into loaves, and Fig. 5 is a view of the pan-support which is used in lieu of the cabinet-cover when dough is to be raised.

Similar letters of reference designate corresponding parts in all of the views of the drawings, referring to which—

A is the body of my improved cabinet, which is preferably made of wood and mounted upon casters $a$, as shown. The said body is open at its upper end and is provided adjacent to said end with an interior ledge $b$. It is also provided in one of its side walls with a door $c$, and when an incandescent electric light is to be used for raising the dough is further provided with an opening $d$ for the passage of electric wires, the said opening being normally closed by a flap or door $e$, Figs. 1 and 2.

B B are metallic rods interposed between and extending through opposite walls of the body, and C C are nuts arranged on the rods at the outer sides of the said walls and having for their purpose to secure the rods in position. The ends of the rods are bent laterally inward, as indicated by $f$, and serve to connect swinging handles $g$ to the body.

D is a receptacle, of sheet metal or other suitable material, removably arranged in the upper portion of the body and on the rods B. The said receptacle, which is designed to hold loaves of bread, is preferably provided with interior handholds $h$ and also with a flange $i$, designed to bear on the ledge $b$ of the body.

E is the cover of the cabinet. This cover, which is preferably of wood, is provided at one side with walls $j$, and is consequently adapted when inverted, as shown in Fig. 2, to serve as a dough mixing or kneading board. When the cover is in the position shown in Fig. 1, it closes the upper end of the body A and is adapted to serve as a carving-board. Handholds $k$ $l$ are provided in the said cover in order to enable an attendant to conveniently handle the same.

F is a foraminated support which by preference comprises two sections $m$ and hinges $n$, connecting the same, and is therefore adapted to be folded when not in use. This support is used on the body A when the receptacle D and the cover E are removed, and on it are placed pans containing loaves of dough to be raised, as shown in Fig. 3.

G is a support which preferably comprises two sections $p$ and hinges $q$, connecting the same, and has the inner edges of its sections recessed, as indicated by $r$, to form a seat designed to receive a dough-pan. The said support G is used on the body A, as shown in Fig. 4, when it is desired to raise a mass of dough precedent to forming the same into loaves.

H is a lamp arranged in the lower portion of the body A and designed to furnish the heat to raise the dough, and I is a device, preferably in the form of an inverted cone, which is arranged on the lamp-chimney and has for its purpose to spread the hot air and products of combustion.

In order to enable hot air and products of combustion to escape from the body A when the support G is arranged thereon, the said support is provided with apertures $s$, Fig. 5.

In practice when it is desired to use the cabinet to hold loaves of bread the parts are arranged as shown in Fig. 1 and bread is placed in the receptacle D. I also desire it understood that when the parts are arranged as shown in Fig. 1 and the receptacle D is provided with a draw-pipe *t*, Fig. 1, the cabinet may be used to advantage as a refrigerator, ice being placed in the receptacle D and provisions in the portion of the cabinet below said receptacle. When ice is placed in the sheet-metal receptacle, the rods D will serve to support and prevent undue caving of the bottom thereof.

When it is desired to use the cabinet to raise a pan of dough, the receptacle D and cover E are removed, a lighted lamp or other heater is placed in the lower portion of the body A, the support G is placed on the body, and the pan of dough in the seat of the support, Fig. 4, while when it is desired to use the cabinet to raise loaves of dough in pans the support F is used in lieu of the support G, and the pans containing loaves of dough are placed on said support F, Fig. 3.

I have entered into a detailed description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention as claimed.

When desirable, the body A of the cabinet may be lined with sheet metal, and the side of the cover E which is adapted to serve as a dough mixing or kneading board may be covered with sheet metal.

When the receptacle D is used as a breadholder, a cap (not shown) may, if desired, be placed over the lower end of the drain-pipe *t*.

Having described my invention, what I claim, and desire to secure by Letters Patent, is—

1. A kitchen-cabinet comprising a body open at its upper end, rods interposed between and secured in opposite walls of the body at an intermediate point in the height thereof, a sheet-metal receptacle arranged in the upper portion of the body and on the rods, and a cover removably arranged on the body and having depending, angular walls *j*, whereby it is adapted, when inverted, to serve as a dough mixing or kneading board.

2. A kitchen-cabinet comprising a body, rods interposed between and secured in opposite walls of the body, handles connected to said rods and arranged outside the body, and a receptacle arranged in the body, and on the rods.

In testimony whereof I have hereunto set my hand in presence of two subscribing witnesses.

MICHAEL J. CARR.

Witnesses:
ARTHUR D. WOOD,
HERBERT H. MOORE.